Feb. 13, 1968 A. J. WILTSHIRE 3,368,239
APPARATUS FOR MOLDING IMPREGNATED GLASS FIBER ARTICLES
Filed April 28, 1965 5 Sheets-Sheet 1
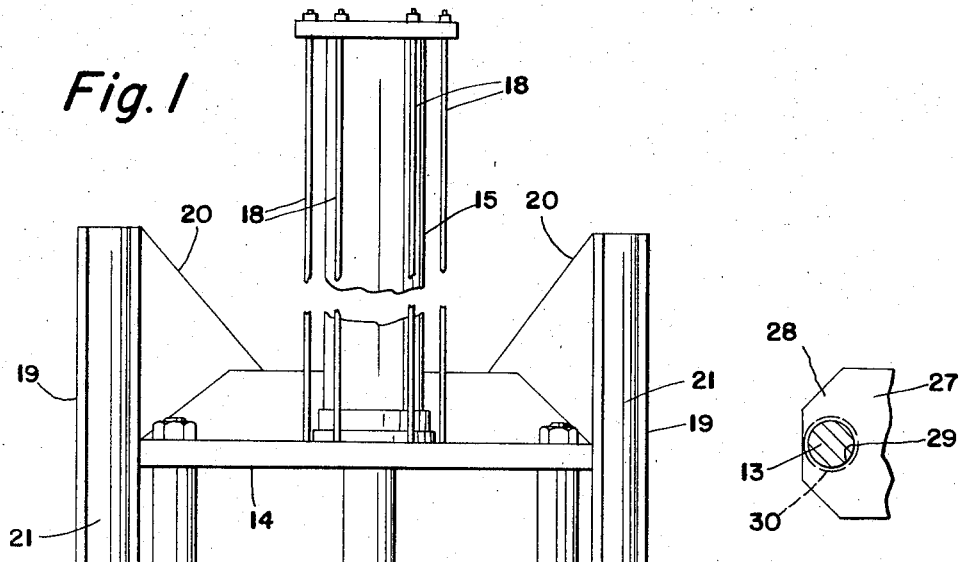
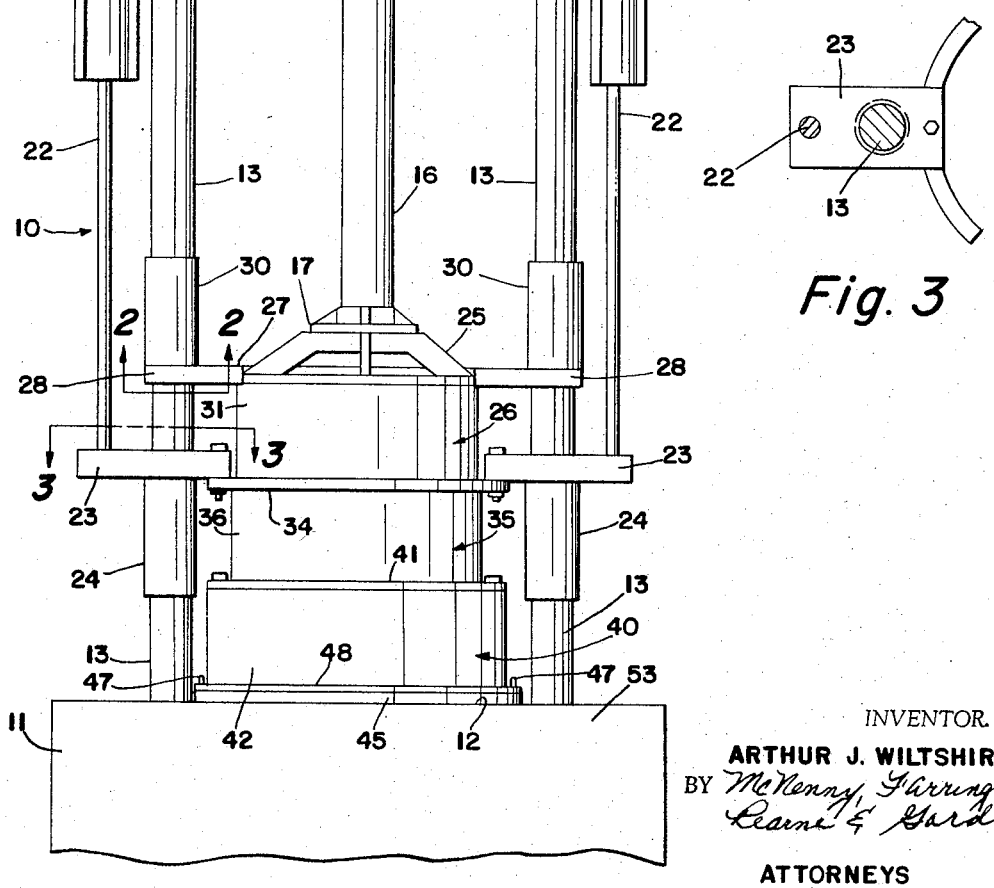
INVENTOR.
ARTHUR J. WILTSHIRE
BY McNenny, Farrington,
Pearne & Gordon
ATTORNEYS Feb. 13, 1968  A. J. WILTSHIRE  3,368,239
APPARATUS FOR MOLDING IMPREGNATED GLASS FIBER ARTICLES
Filed April 28, 1965  5 Sheets-Sheet 2

INVENTOR.
ARTHUR J. WILTSHIRE
BY McNenny, Farrington
Pearne & Gordon
ATTORNEYS

Feb. 13, 1968  A. J. WILTSHIRE  3,368,239
APPARATUS FOR MOLDING IMPREGNATED GLASS FIBER ARTICLES
Filed April 28, 1965  5 Sheets-Sheet 4

INVENTOR.
ARTHUR J. WILTSHIRE
BY McKenny, Farrington
Pearne & Gordon
ATTORNEYS

United States Patent Office 3,368,239
Patented Feb. 13, 1968

3,368,239
APPARATUS FOR MOLDING IMPREGNATED
GLASS FIBER ARTICLES
Arthur J. Wiltshire, Cleveland, Ohio, assignor to
Structural Fibers, Inc., Chardon, Ohio, a corporation of Ohio
Filed Apr. 28, 1965, Ser. No. 451,427
7 Claims. (Cl. 18—5)

This invention relates to apparatus for the manufacture of fiber-reinforced molded articles, and it pertains more particularly to a molding press for fabricating such articles at a single station.

This invention constitutes an improvement in the molding apparatus described in U.S. Patent No. 2,977,269 to C. M. Nerwick and U.S. Reissue Patent No. 25,241 to D. W. Randolph. According to the methods described in these patents, hollow cylindrical, fiber-reinforced, plastic tanks are successfully and economically pressure-molded so that the finished articles have substantially uniform wall thickness, with substantially evenly distributed matted fibers, and the entrapment of air and the formation of voids in the matted fibers are avoided. These methods contemplate, generally, the step of laying up fiber matting in the approximate form of the desired object and encasing this form within a rigid mold casing. An expandable bag or envelope or other fluid-expandable membrane, which will define the shape of the finished article, is positioned within the laid-up form in the mold, and preformed fiber end wall caps are telescoped into each end of the laid-up form. The external mold is enclosed by clamping to the end of the mold casing rigid casing caps which shape the end walls of the tank formed therein. With the mold and fiber preforms thus assembled, the matting is placed under a suitably moderate pressure by expanding the bag to hold the fiber matting in place against the mold, and then the fiber matting is partially permeated with a thermosetting resin or the like. The bag is subsequently expanded by further inflation to progressively compress the fiber matting in such a manner as to distribute the resin throughout the matting and achieve the desired result of pressure molding, while at the same time avoiding migration of the fibers and destruction of the laid-up fiber mats.

After the fiber body of the article has been thus impregnated and shaped within the mold, the casing of the mold is subjected to heat in order to set the resin. To this end, the entire mold is immersed in a hot water bath so that the resin will attain its setting temperature by a uniform application of heat.

According to the techniques recited in the above-mentioned patents, the mat and preform lay-up and mold assembly step, the resin injection step, and the heating step are all performed at separate production stations. The performance of these operations at different stations enables the manufacturer to arrange his plant layout for production on a line basis. Although production on a line basis is highly suitable for many manufacturing operations, the assembly line technique requires excessive floor space. Moreover, the speed and efficiency of the line is keyed to the slowest manufacturing operation and/or worker. Those skilled in the art appreciate that the most time-consuming manufacturing operation is the heating step which is employed to set the resin. The time required for this step is directly proportional to the size of the mold, and, even though a line operation is flexible in that different size tanks may be produced by a single line by employing different size molds, the speed of the entire line is dependent upon the curing time required for the large tanks.

This invention is an improvement in mold apparatus for pressure-molding fiber-reinforced articles, and has for its principal objective the provision of a mold apparatus which overcomes the disadvantages of a line operation such as discussed above. In particular, the invention contemplates a single station molding apparatus that will permit all of the molding and curing operations mentioned above to be conducted at a single work station, thereby eliminating the need for excessive floor space and conveyor systems. In general, this is accomplished by the provision of a molding press having a fixed lower platen and two independent upper platens which are movable with respect to the lower platen. The lower platen is provided with a female die which defines one rigid casing cap for one end wall of the tank to be formed, and the movable upper platens are respectively provided with dies which define the other rigid casing cap and the cylindrical side wall mold casing.

In some embodiments of the tanks set forth in Reissue Patent No. 25,241, the bottom end wall of a completed tank is provided with an annular, integrally molded foot structure or bottom support for the tank. To this end, the lower mold cap is provided with a deep annular groove which is filled with strips of glass fiber matting prior to closing the mold casing. After the mold casing has been closed with the laid-up matting form positioned therein, including the glass fiber which has been inserted into the annular groove in the lower end cap, the form is permeated with liquid resin and the resin is thereafter cured.

While the foregoing procedure has been successfully followed in the pressure molding of hollow articles, it has been found that the practice of providing an integrally molded foot structure or bottom support according to Reissue Patent No. 25,241 has been the cause of certain manufacturing problems and product defects and limitations. One of these problems is attributed to the fact that, since the liquid resin has lubricating qualities, the glass fibers in the annular groove tend to migrate by flowing with the impregnating liquid. The patents noted above have obviated the problem of fiber migration in the tank walls by subjecting the laid-up fiber forms to suitable compressive forces exerted by the expandable bag or envelope. Since the glass fibers in the annular groove are relatively remote from the expandable bag, it is impossible to subject these fibers to the necessary uniform pressure to which the tank walls are subjected by the pressure in the bag. As a result, the fibers in the annular groove will be either loosely or nonuniformly compacted, as compared to the uniform compaction of the wall structure. Furthermore, since the glass fibers that are inserted into the annular groove in the lower mold cap are usually in the form of one or more strips of glass fiber matting, it is difficult to cut the strips so that they are correctly positioned in the annular groove. If the strips are cut too wide, they will provide an objectionable excess of glass fibers at the intersection between the lower fiber end wall cap and the glass fiber foot structure preform and a consequent lack of resin and an inwardly extending annular projection in that zone after impregation and compression. If, on the other hand, the strips are cut too narrow, an objectionable lack of glass fibers, a resin-rich area, and an outwardly extending annular projection will result at that intersection after impregnation and compression. Even if the strips are cut to the desired size, they are often improperly positioned in the annular groove and the above-mentioned discontinuities result.

In other embodiments of such tanks, a tank and a foot structure are produced separately and the foot structure is permanently affixed to the bottom of the tank by a suitable plastic cement. While this procedure has been successful in some instances, this practice has also been the cause of certain manufacturing problems and product defects and limitations. One disadvantage of this method is that it necessitates the additional and expensive manufacturing step of positioning the tank in a vertical position and, thereafter, cementing a foot structure on the vertically aligned tank.

A further objective of this invention is the provision of a molding apparatus which overcomes the disadvantages of molding a foot structure for a tank in the manner discussed above. In particular, the invention contemplates the provision of a molding apparatus that will insure the application of a uniform compressive force to a preformed foot structure lay-up that obviates the problem of fiber migration in this area of the tank when the tank is impregnated with a thermosetting resin.

These and other objects and advantages of the invention will become apparent from the following description of the invention, made by way of example. In the accompanying drawings which supplement the description:

FIG. 1 is an elevational view of a molding press according to the present invention;

FIG. 2 is a fragmentary, sectional view, the plane of the section being indicated by the line 2—2 in FIG. 1;

FIG. 3 is a fragmentary, sectional view, the plane of the section being indicated by the line 3—3 in FIG. 1;

Figure 4:
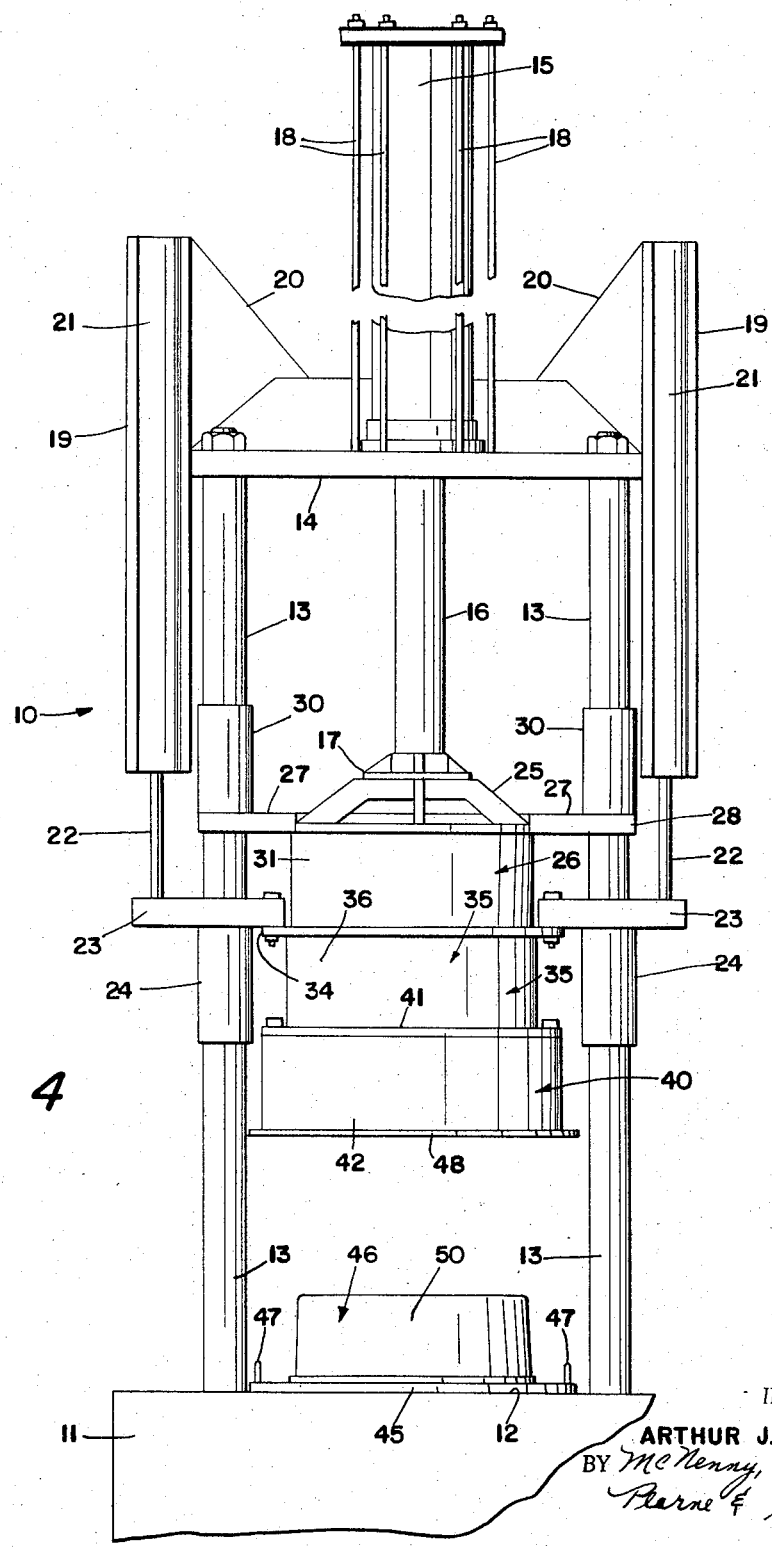
FIG. 4 is an elevational view similar to FIG. 1, but showing both upper mold platens in a raised position.
Figure 5:
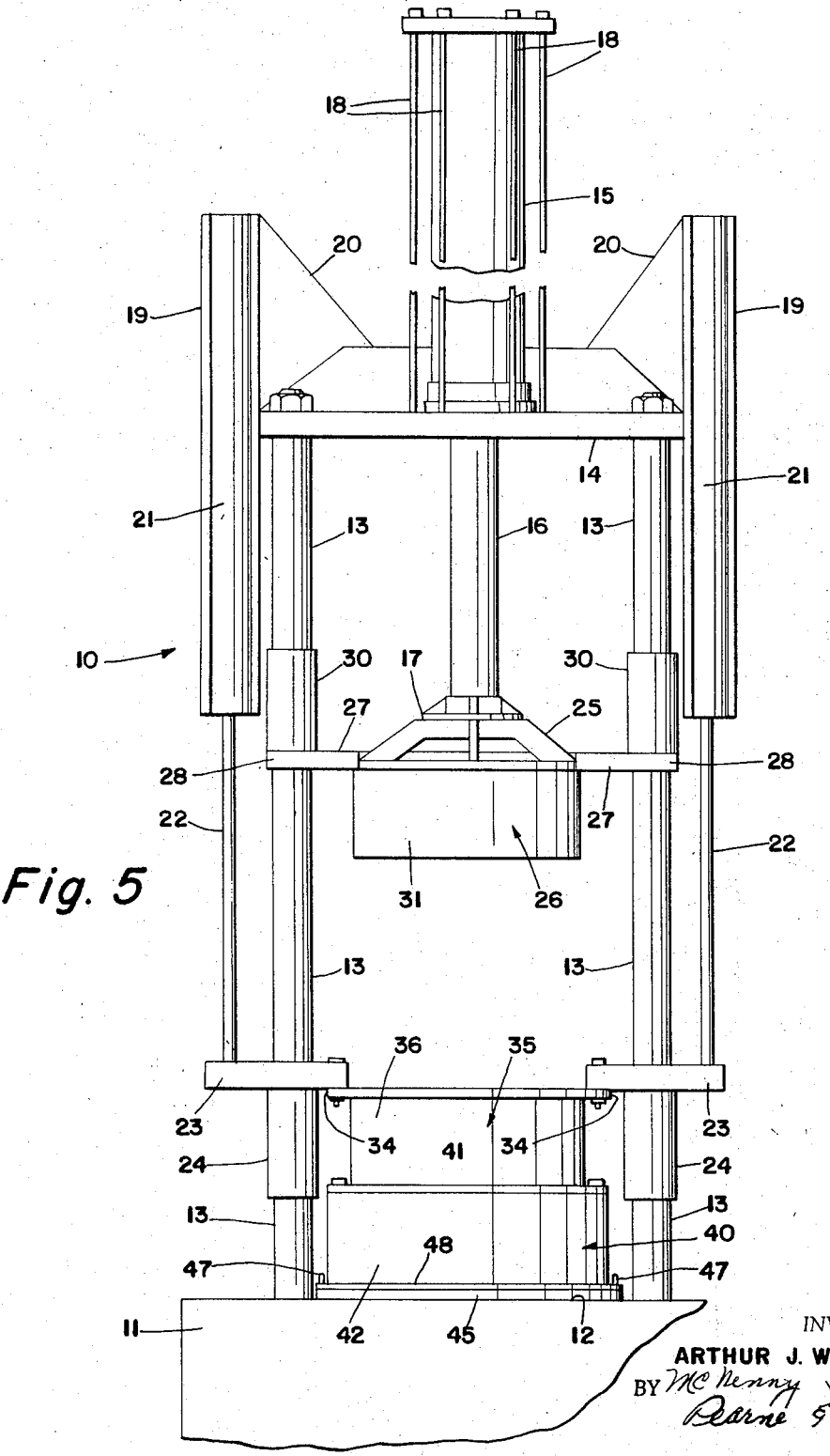
FIG. 5 is an elevational view similar to FIG. 1, but showing one of the upper mold platens in a raised position.

Referring now to the drawings, and particularly to FIG. 1, a molding press 10 is illustrated. The molding press 10 includes a base 11, a fixed lower platen 12 mounted on the base 11, and a pair of vertically extending, parallel guide rods 13. A top frame member 14 is mounted on the guide rods 13 and supports a double-acting hydraulic cylinder 15. A ram 16 is slidably mounted in the cylinder 15 and has a flange 17 at its lower end. The cylinder 15 is braced on the top frame 14 by a plurality of tie rods 18.

A pair of vertically extending plates 19 are fixed to the edges of the frame 14 and are further braced by plates 20. Each plate 19 supports a double-acting hydraulic cylinder 21, and each cylinder 21 has a downwardly extending ram 22. The lower end of each ram 22 is fixed to a horizontal lifting plate 23, and each lifting plate 23 is provided with a guide sleeve 24, each of which is mounted on one of the guide rods 13.

A spider frame 25 is fixed to the flange 17 at the lower end of the ram 16 and the frame 25 is, in turn, fixed to the upper surface of an upper mold casing cap 26. A plate 27 is also fixed to the upper surface of the cap 26, and the plate 27 has laterally extending edges 28 which are provided with bores 29. Each bore 29 slidably engages one of the guide rods 13, and a sleeve 30 is fixed to each plate edge 28 in axial alignment with each bore 29.

Figure 7:
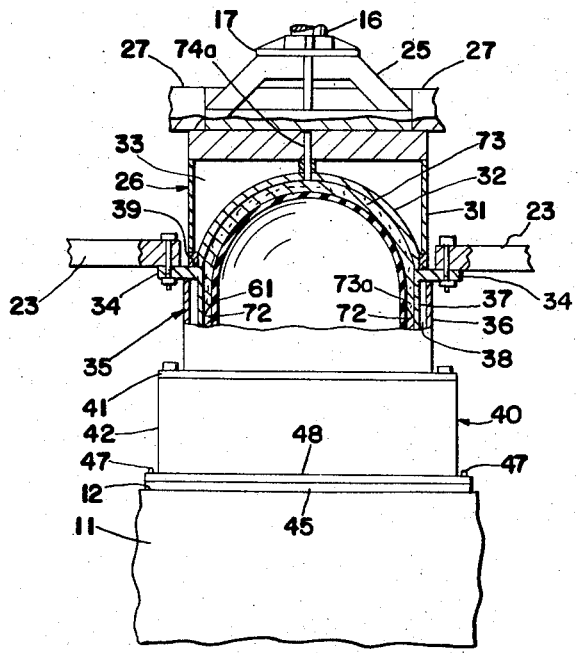
FIG. 7 is a fragmentary view, partly in section, of another portion of the press illustrated in FIG. 1.

As may be seen most clearly in FIG. 7, the casing cap 26 includes an outer jacket 31 and an inner jacket 32. The inner surface of the jacket 32 is in the shape of an oblate ellipsoid of revolution, or it may be hemispherical. It may also have other shapes which, however, will be less adaptable to the production of a strong tank structure. For reasons which will hereinafter become apparent, the jackets 31 and 32 define a chamber 33 for a heating means such as steam.

The inner ends of the guide plates 23 are bolted to a radially extending, upper flange portion 34 of a cylindrical mold casing 35. The mold casing 35 includes an outer jacket 36 and an inner jacket 37, the latter having a cylindrical inner surface. The jackets 36 and 37 define a steam chamber 38. The upper mold casing cap 26 rests on the flange 34 so that the inner surface of the jacket 32 forms a smooth continuation of the inner surface of the jacket 37. A sealing ring 39 is provided at the lower end of the casing cap 26 to provide a tight seal between the casing cap 26 and the mold casing 35.

Figure 6:
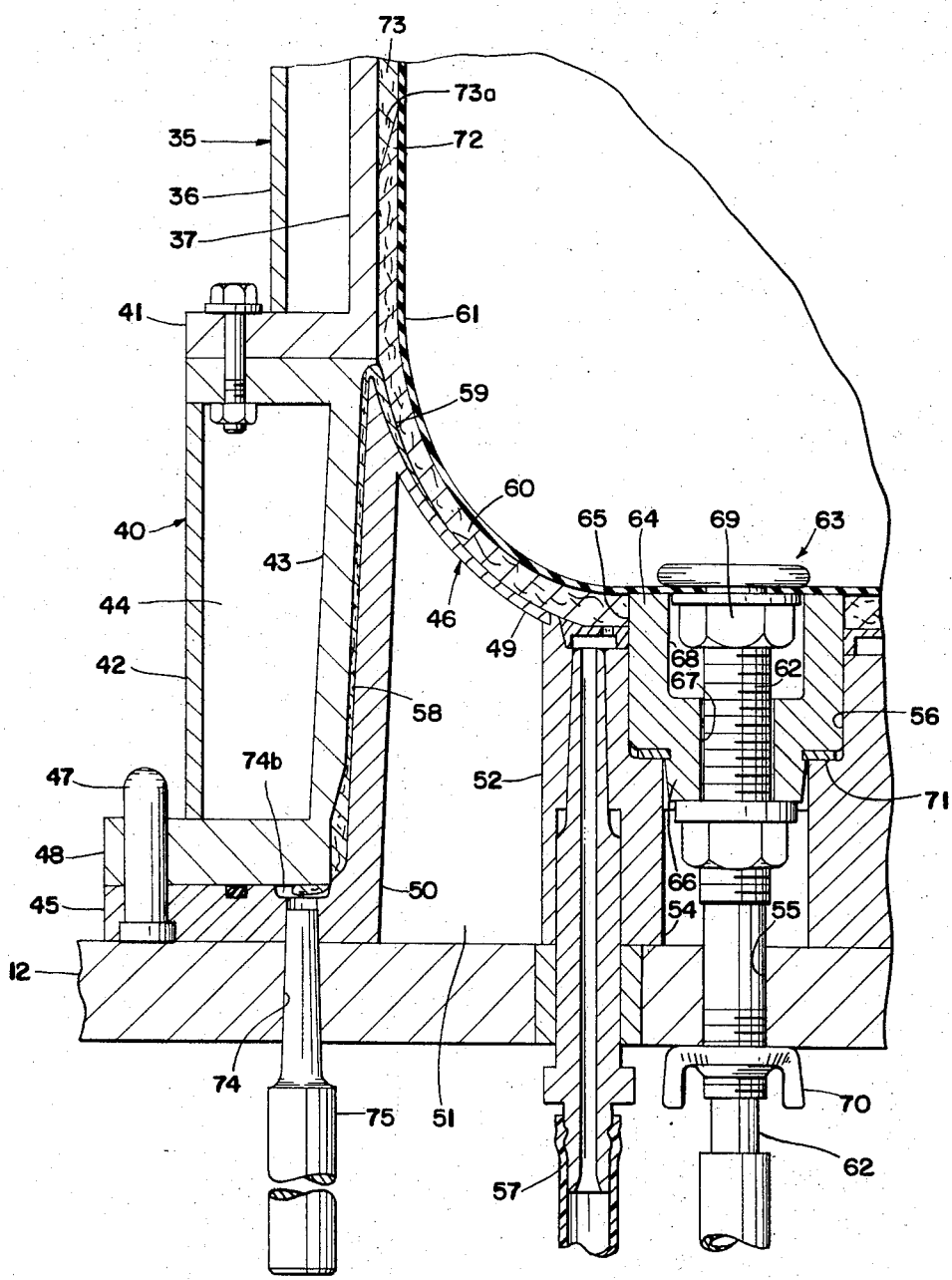
FIG. 6 is an enlarged, fragmentary view, partly in section, of a portion of the press illustrated in FIG. 1.

As may be seen most clearly in FIG. 6, a depending annular skirt 40 is bolted to a radially extending lower flange portion 41 of the mold casing 35. The skirt 40 includes an outer jacket 42 and an inner jacket 43. The jackets 42 and 43 define a steam chamber 44. The inner surface of the jacket 43 is spaced radially outwardly from the inner surface of the jacket 37 at its upper end and tapers outwardly for its full height toward its lower end.

The bottom surface of the skirt 40 rests on an outwardly extending flange portion 45 of a lower mold casing cap 46. To insure proper registry between the skirt 40 and the casing cap 46, a plurality of guide pins 47 are fixed to the flange portion 45 and extend through a lower flange 48 of the skirt 40. The casing cap 46 includes an inner jacket 49 and an outer jacket 50. The jackets 49 and 50 define an annular steam chamber 51. The outer surface of the jacket 50 is spaced a slight distance from the inner surface of the jacket 43 to provide an annular molding chamber therebetween. The internal surface of the jacket 49 is in the shape of an oblate ellipsoid of revolution, or it may be hemispherical.

The jacket 49 is provided with an axially extending projection 52 which rests on and is fixed to the lower platen 12 of the press 10. The projection 52 is provided with an axial bore 54 which communicates with a bore 55 in the lower platen 12.

The bore 54 is provided with a coaxial counterbore 56 which extends downwardly into the projection 52.

The lower casing cap 46 is provided with a resin supply line 57 which extends through the projection 52 and the lower platen 12 and is offset from the counterbore 56. A plurality of drains or sprues 74 open downwardly through the flange 45 and the platen 12 and communicate with the mold cavity defined by the jackets 43 and 50. These sprues or drains may be closed at an appropriate time in the molding process by taper pins 75, as described below.

In order to manufacture a fiber-reinforced, molded resin tank, the mold casing cap 26 and the mold casing 35 and its depending skirt 40 are raised to the position illustrated in FIG. 4. This is accomplished by first retracting the ram 16 into its cylinder 15 by hydraulic pressure. After the ram 16 has been retracted, the rams 22 are retracted into their cylinders 21 to raise the mold casing 35. Suitable interlocked controls (not shown) may be provided between the cylinders 21 and the cylinder 15 so that the cylinders 21 may not be actuated until the ram 16 has been completely raised. With the mold casing cap 26 and the mold casing 35 in their raised positions, a preformed fiber foot blank 58 is slipped over the outer surface of the jacket 50. The foot blank 58 includes an upper, inwardly and downwardly depending lip portion 59 which fits over the juncture between the jackets 49 and 50 and feathers or tapers into the mold surface formed by the inner surface of the jacket 49. A preformed fiber end and side wall cap 60 having a central opening therein is placed on the ellopsoidal inner surface of the jacket 49. The end and side wall cap 60 is provided with a uniformly feathered rim 72 and, as may be seen in FIG. 6, the end and side wall cap 60 overlaps the depending lip portion 59 of the foot blank 58.

An inflatable, flexible bag or envelope comprising a rubber bag 61 is positioned on the end cap 60. Preferably, the flexible envelope is encased in a protective sheath (not shown) of polyvinyl alcohol film or polyester film, or similar material which will protect the molding materials against chemical action of vulcanizing agents or residues thereof associated with the bag 61. The bag 61 and protective sheath are connected to a threaded fluid conduit 62 by a clamping structure 63. The clamping structure 63 serves to position the end cap 60 axially in its mold cavity and includes a lightweight metal core 64 which is slidably received on the conduit 62 below the bag 61. As shown, the core 64 is in the form of a generally cylindrical body 65 having an axially extending lower neck portion 66. The neck portion 66 has an outer diameter such that it may be fitted within the axial bore 54 of the lower casing cap 46, and has a bore 67 which is slightly larger than the fluid conduit 62 of the bag 61. The bore 67 communicates at its upper end with a recess 68 in the top of the cylindrical body 65 of the core 64. This recess receives a jamb nut 69 which is used to secure the bag 61 to the conduit 62.

When the core 64 and the conduit 62 are properly positioned in the bore 54 and the counterbore 56, a wing nut 70 is threaded onto the outside of the conduit 62 until it butts against the bottom of the lower platen 12. This draws the cylindrical body 65 downwardly in sealing engagement with a washer 71. The conduit 62 is then connected to a suitable air pressure source (not shown).

The bag 61 is then inflated until it assumes the shape indicated in FIGS. 6 and 7. The bag 61 is not inflated to a degree that would cause the bag to bulge or distort, however. A preformed fiber end and side wall cap 73 having a uniformly feathered rim 73a is placed over the top of the bag 61 so that the feathered rim 73a overlaps the feathered rim 72 of the lower end cap 60 to form a continuous, uninterrupted joint which has substantially the same uniform thickness and bulk factor as the other wall portions of the caps 60 and 73.

The hydraulic cylinders 21 are then actuated to lower the cylindrical mold casing 35 and its depending annular skirt 40 onto the outwardly extending flange 45 of the lower mold casing cap 46. The blank 58 is thereby compacted between the jacket 43 and the jacket 50 so that the fibers of the blank 58 are precompressed. As the lower flange 48 of the skirt 40 is brought into engagement with the flange 45, any excess fiber at the lower end of the foot blank 58 is pinched off and the excess fiber lies in an annular cavity 74b.

The cylinder 15 is actuated to lower the upper mold casing cap onto the flange 34. The bag 61 is then further inflated with enough pressure to bring it firmly into contact over its entire surface with the inner surfaces of the fiber matting forms. This holds the fiber matting forms against relative shifting while a conventional liquid resin, settable by heat, a catalyst, or the like, is introduced through the supply line 57 in a measured amount. The amount of resin introduced is such that the charge will permeate the entire fiber lining in the mold during the subsequent pressurizing operation and, preferably, a slight excess of resin is provided so that the rising column of resin in the fiber matting will drive out all of the air. Excess air is forced out of the mold through a duct 74a through the casing cap 26. After the measured amount of resin has been introduced, the pressure in the bag 61 is gradually increased to a maximum molding pressure required. When the excess of resin has been forced upwardly through the duct 74a, the duct 74a is plugged. When the resin appears in the sprues 74, the taper pins 75 are inserted. Steam at a temperature of between about 215° and 220° F. is then introduced to the steam chambers 33, 38, 44, and 51, to heat the resin-impregnated cylinder and foot and thereby set the resin.

Figure 8:
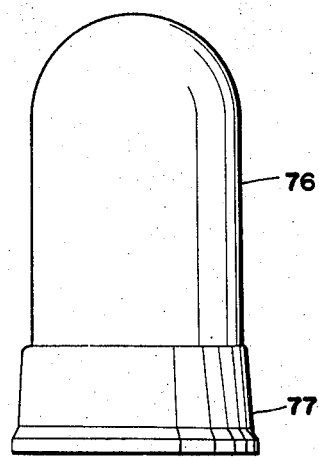
FIG. 8 is an elevational view of a completed tank produced in accordance with this invention.

After the resin has set, the cylinder 15 is again actuated to raise the upper mold casing cap 26 and with the cap 26 in its fully raised position, the cylinders 21 are actuated to raise the cylindrical mold casing 35 and its depending skirt 40. The air pressure within the bag is released and a molded cylindrical tank 76 (FIG. 8) is then removed by hand from the molding press 10. The bag is removed from the tank at the same time since it remains associated with the lower casing cap 46. The tank 76 comprises a fiber-reinforced, hollow, molded resin structure having an integrally molded foot structure 77 permanently bonded to its lower end.

The scope of the invention is not limited to the slavish imitation of all of the structural and operative details mentioned above. These have been given merely by way of an example of a presently preferred embodiment of the invention.

What is claimed is:

1. A molding press for producing molded resin articles comprising a fixed lower platen and upper platen means, means to move said upper platen means along a predetermined path, mold cavity means fixed on said lower platen and defining a portion of the outside surface of the article to be produced, mold cavity means on said upper platen means defining the remainder of the outside surface of the article to be produced, a first conduit means extending through one of said cavity means, an inflatable bag fixed to said first conduit means inside said mold cavity means whereby said bag may be inflated through said conduit means by pressurized fluid so that the inflated bag will define the inside surface of the article to be produced, and a second conduit means extending through one of said cavity means for injecting a measured amount of resin into the cavity means.

2. A molding press for producing a hollow, molded resin tank body having side and end walls comprising a fixed lower platen and upper platen means, means to move said upper platen means along a predetermined path, mold cavity means fixed on said lower platen and defining the outside surface of the lower end wall of the tank body, mold cavity means on said upper platen means defining the outside surface of the upper end wall and the outside surface of the side wall of the tank, a first conduit means extending through the mold cavity means fixed on the lower platen, an inflatable bag fixed to said first conduit means inside said mold cavity means whereby said bag may be inflated through said conduit means by a pressurizing fluid so that the inflated bag will define the inside surface of the tank to be produced, and a second conduit means extending through the mold cavity means fixed on said lower platen for injecting a measured amount of resin into the cavity means.

3. A molding press for producing hollow, molded resin articles having a supporting foot structure comprising a fixed lower platen and upper platen means, means to move said upper platen means along a predetermined path, mold cavity means fixed on said lower platen and defining a portion of the outside surface of the body of the article to be produced and also defining the inside surface of the foot structure, mold cavity means on said upper platen means defining the remainder of the outside surface of the body of the article and also defining the outside surface of the foot structure of the article, a first conduit means extending through one of said cavity means, an inflatable bag fixed to said first conduit means inside said mold cavity means whereby said bag may be inflated through said conduit means by a pressurizing fluid so that the inflated bag will define the inside surface of the body of the article to be produced, and a second conduit means extending through one of said cavity means for injecting a measured amount of resin into the cavity means.

4. A molding press for producing a hollow, molded resin tank body having side and end walls and a supporting foot structure comprising a fixed lower platen and upper platen means, means to move said upper platen means along a predetermined path, mold cavity means fixed on said lower platen and defining the outside surface of the lower end wall of the tank body and also defining the inside surface of the supporting foot structure, mold cavity means on the upper platen means defining the outside surface of the upper end wall and the outside surface of the side wall of the tank and also defining the outside surface of the foot structure of the tank, a first conduit means extending through the mold cavity means fixed on the lower platen, an inflatable bag fixed to said first conduit means inside said mold cavity means whereby said bag may be inflated through said conduit means by a pressurizing fluid so that the inflated bag will define the inside surface of the tank to be produced, and a second conduit means extending through the mold cavity means fixed on said lower platen for injecting a measured amount of resin into the cavity means.

5. A molding press for producing hollow, molded resin articles comprising a fixed lower platen and a pair of upper platens, means to move each of said upper platens along a predetermined path relative to each other and relative to the lower platen, mold cavity means fixed on said lower platen and defining a portion of the outside surface of the article to be produced, mold cavity means on each of said upper platens defining the remainder of the outside surface of the article to be produced, a first conduit means extending through one of said cavity means, an inflatable bag fixed to said first conduit means inside said mold cavity means whereby said bag may be inflated through said conduit means by a pressurizing fluid so that the inflated bag will define the inside surface of the article to be produced, and a second conduit means extending through one of said cavity means for injecting a measured amount of resin into the cavity means.

6. A molding press for producing a hollow, molded resin tank body having side and end walls comprising a fixed lower platen and a pair of upper platens, means to move each of said upper platens along a predetermined path relative to each other and relative to the lower platen, mold cavity means fixed on said lower platen and defining the outside surface of the lower end wall of the tank body, mold cavity means on each of said upper platens respectively defining the outside surface of the upper end wall and the outside surface of the side wall of the tank, a first conduit means extending through the mold cavity means fixed on the lower platen, an inflatable bag fixed to said first conduit means inside said mold cavity means whereby said bag may be inflated through said conduit means by a pressurizing fluid so that the inflated bag will define the inside surface of the tank to be produced, and a second conduit means extending through the mold cavity means fixed on said lower platen for injecting a measured amount of resin into the cavity means.

7. A molding press for producing a hollow, molded resin tank body having side and end walls and a supporting foot structure comprising a fixed lower platen and a pair of upper platens, means to move said upper platens along a predetermined path relative to each other and relative to said lower platen, mold cavity means fixed on said lower platen and defining the outside surface of the lower end wall of the tank body and also defining the inside surface of the supporting foot structure, mold cavity means on each of said upper platens, the mold cavity means on one of said upper platens defining the outside surface of the upper end wall of the tank and the mold cavity means on the other upper platen defining the outside surface of the side wall of the tank and also defining the outside surface of the foot structure of the tank, a first conduit means extending through the mold cavity means fixed on the lower platen, an inflatable bag fixed to said first conduit means inside said mold cavity means whereby said bag may be inflated through said conduit means by a pressurizing fluid so that the inflated bag will define the inside surface of the tank to be produced, and a second conduit means extending through the mold cavity means fixed on said lower platen for injecting a measured amount of resin into the cavity means.

References Cited
UNITED STATES PATENTS

| | | |
|---|---|---|
| 2,329,425 | 9/1943 | Steel. |
| 2,357,867 | 9/1944 | Babbitt et al. |
| 2,644,198 | 7/1953 | Crawford. |
| 2,696,184 | 12/1954 | Demarest. |
| 2,977,268 | 3/1961 | Randolph. |
| 2,977,268 | 3/1961 | Nerwick. |
| 3,137,898 | 6/1964 | Geringer. |
| 3,149,375 | 9/1964 | Gehl. |
| 3,153,833 | 10/1964 | Jackson. |
| 3,200,442 | 8/1965 | Haller. |
| 3,313,871 | 4/1967 | Vogel et al. |

J. HOWARD FLINT, JR., *Primary Examiner.*